US012107613B2

(12) United States Patent
Abedin et al.

(10) Patent No.: US 12,107,613 B2
(45) Date of Patent: Oct. 1, 2024

(54) COMMUNICATION DEVICE WITH BODY-WORN DISTRIBUTED ANTENNAS

(71) Applicant: MOTOROLA MOBILITY LLC, Wilmington, DE (US)

(72) Inventors: Md Faisal Abedin, Lake Bluff, IL (US); Mohammed Abdul-Gaffoor, Palatine, IL (US); Junsheng Zhao, Vernon Hills, IL (US); Xuyuan Pan, Chicago, IL (US); Andrius Lietuvninkas, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/708,449

(22) Filed: Mar. 30, 2022

(65) Prior Publication Data

US 2023/0318650 A1    Oct. 5, 2023

(51) Int. Cl.
*H04B 1/38*     (2015.01)
*H01Q 1/27*     (2006.01)
*H01Q 21/06*    (2006.01)
*H04B 1/3827*   (2015.01)

(52) U.S. Cl.
CPC ............ *H04B 1/385* (2013.01); *H01Q 1/273* (2013.01); *H01Q 21/061* (2013.01); *H04B 2001/3855* (2013.01)

(58) Field of Classification Search
CPC ............ H04B 1/385; H04B 2001/3855; H01Q 1/273; H01Q 21/061
See application file for complete search history.

(56) References Cited

U.S. PATENT DOCUMENTS

| 5,956,630 | A | 9/1999 | Mackey |
| 6,594,370 | B1* | 7/2003 | Anderson ............... H04R 5/023 |
| | | | 381/364 |
| 10,003,369 | B2 | 6/2018 | Ooi et al. |
| 10,360,907 | B2* | 7/2019 | Dayal ................. G01C 21/3629 |
| 2011/0224976 | A1* | 9/2011 | Taal ......................... G10L 25/69 |
| | | | 704/E21.002 |
| 2015/0198454 | A1 | 7/2015 | Moore et al. |
| 2018/0131080 | A1 | 5/2018 | Boyes |
| 2018/0149884 | A1* | 5/2018 | Miller .................. H04B 5/0037 |
| 2018/0367899 | A1* | 12/2018 | Lee ......................... H01Q 1/273 |
| 2020/0133398 | A1* | 4/2020 | Williams ................. G06F 3/017 |
| 2020/0162140 | A1* | 5/2020 | Tusi ......................... H04W 4/38 |
| 2020/0274235 | A1* | 8/2020 | Chuang .................. H01Q 3/247 |
| 2022/0351468 | A1* | 11/2022 | Rahman .............. G06F 9/45558 |
| 2023/0096634 | A1* | 3/2023 | Shih ......................... H01Q 1/42 |
| | | | 343/700 R |

* cited by examiner

*Primary Examiner* — Junpeng Chen
(74) *Attorney, Agent, or Firm* — Isidore PLLC

(57) ABSTRACT

A communication device incorporates, and a method provides increased communication coverage for a second user device. A support structure has a first spatial portion including first radio frequency (RF) antenna(s) and a second spatial portion including second RF antenna(s). The first and second RF antenna(s) are respectively on different sides of a body of a person for communication coverage for a received RF signal. The first and second RF antenna(s) are spaced apart on the support structure for reduced interference from inter-antenna coupling. A communication subsystem demodulates the RF signal to a baseband signal that is transmitted through a communication cable to a second user device with low data latency.

19 Claims, 10 Drawing Sheets

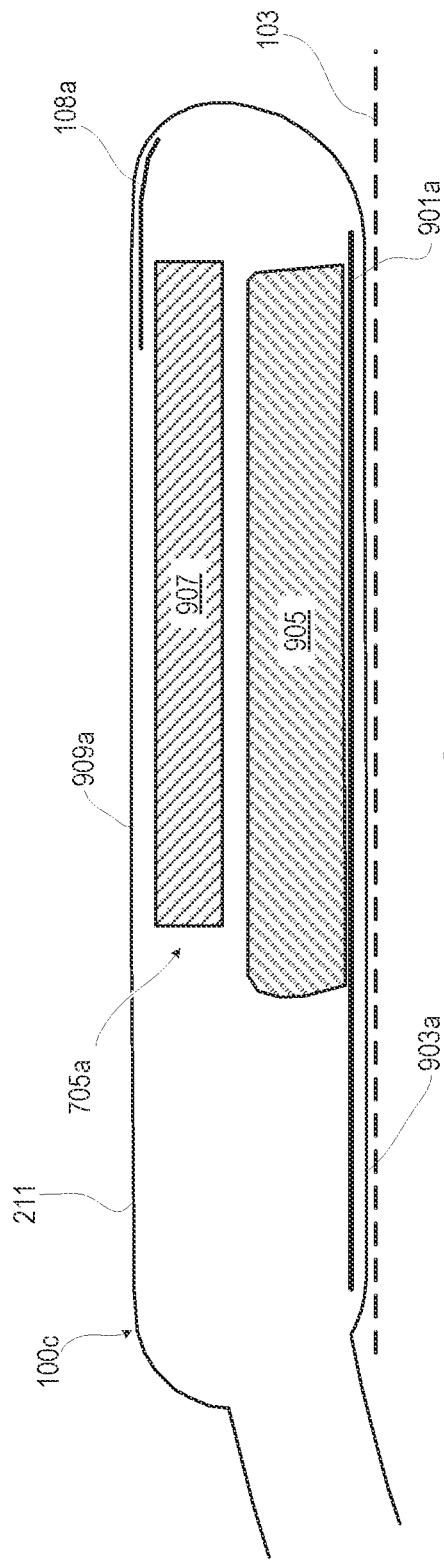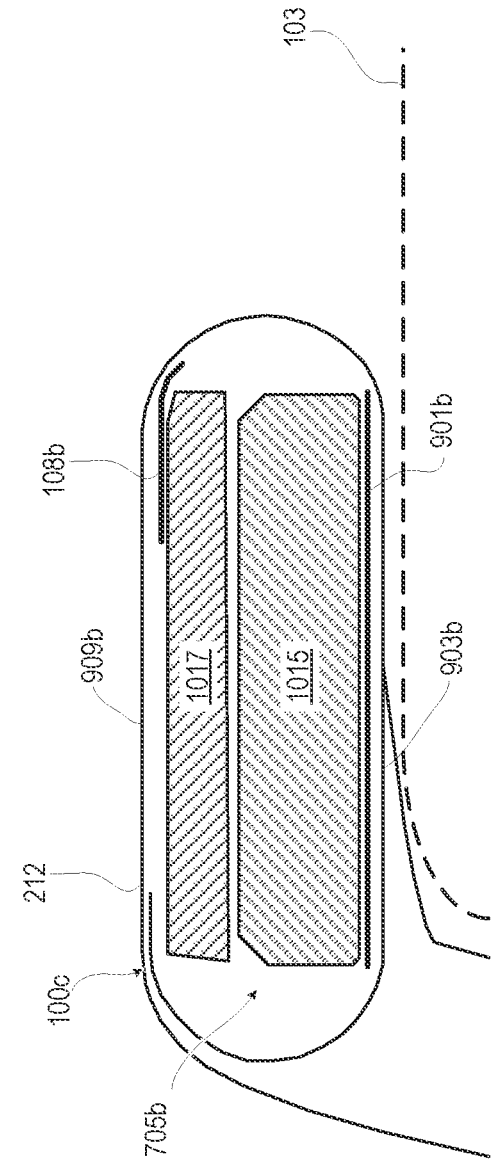

COMMUNICATION DEVICE WITH BODY-WORN DISTRIBUTED ANTENNAS

BACKGROUND

1. Technical Field

The present disclosure relates generally to communication devices, and more particularly to communication devices that directionally optimize radio frequency antenna steering.

2. Description of the Related Art

Mobile communication devices such as smartphones provide a large amount of functionality in a small form factor. The small size enables mobility but limits available space for antennas. To support increased data throughput for functions such as media streaming, mobile communication devices are incorporating millimeter wave (mmWave) communication subsystems to support upper bands allocated to fifth generation (5G) new radio (NR) technologies. The higher frequencies can inherently support greater data speeds. However, the mmWave signals are also inherently more directional as compared to lower radio frequency (RF) bandwidths used for fourth generation (4G) technologies such as the 3rd Generation Partnership Project (3GPP) long term evolution (LTE). Presenting antennas in all required directions is difficult within the form factor of small mobile communication devices that are hand carried or stowed in a pocket.

Augmented reality (AR) display devices, such as AR glasses or goggles, are being introduced in part to provide display options that are not constrained by the small form factor of a mobile communication device. Being able to combine real world imagery with AR imagery enables new "hands free" and "eyes on" uses. A person wearing the AR display device can perform functions such as walking along an AR provided path and using his hands to interface with AR presented objects, assisted by the AR imagery. The AR imagery may include entertainment content, communication services, or user interface controls for other devices. Many of the AR functions rely on AR display device being able to communicate with a base node, such as a 5G NR base node using an integrated antenna system. Some types of these functions require low data latency. As a worn device, AR display devices experience communication limitations. For example, AR glasses or goggles have constrained areas available for presenting RF antennas to make a direct path communication channel with a nearby 5G NR base node, limiting the RF spatial communication coverage area for receiving and transmitting RF signals. Attempting to closely integrate multiple antennas creates interference from inter-antenna coupling, reducing communication quality.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 9 is a cross section view of a rear portion the communication device of FIG. 7, according to one or more embodiments;

FIG. 10 is a top view of the communication device of FIG. 7 providing first and second spatial communication coverage areas respectively to a front and rear of a person, according to one or more embodiments.

DETAILED DESCRIPTION

Figure 1:
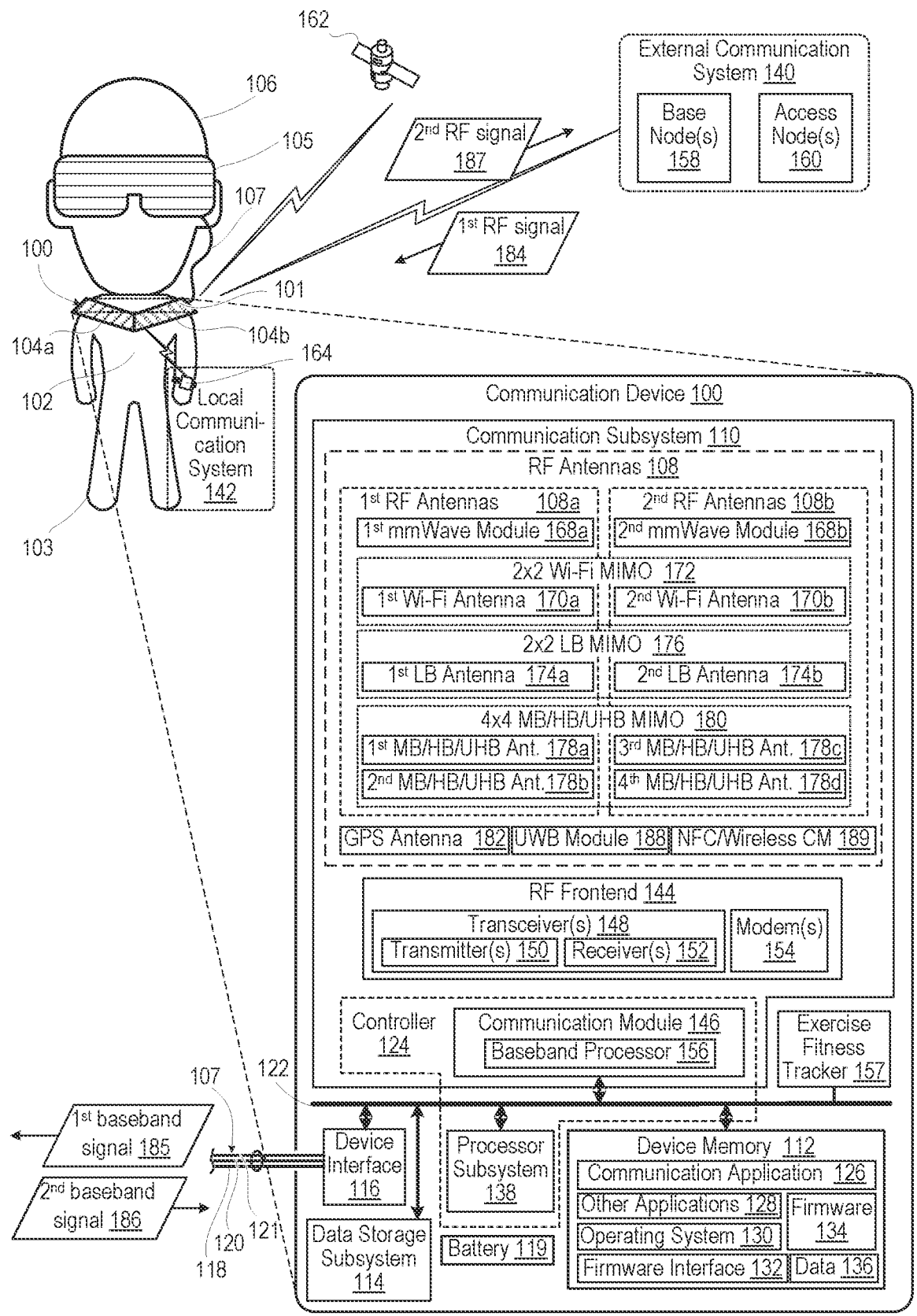
FIG. 1 depicts a functional block diagram of a communication device that provides radio frequency (RF) communication coverage for a second user device, and within which the features of the present disclosure are advantageously implemented, according to one or more embodiments.

According to a first aspect of the present disclosure, a communication device incorporates, and a method provides a communication subsystem that supports a second user device for receiving and transmitting radio frequency (RF) signals. The communication device includes a support structure that is configured to be worn on a body of a person. The support structure has a first spatial portion and a second spatial portion positionable on different parts of the body. At least one first RF antenna is attached to the first spatial portion of the support structure to provide first partial communication coverage in azimuth. At least one second RF antenna is attached to the second spatial portion of the support structure to provide second partial communication coverage in azimuth that complements the first partial communication coverage of the at least one first RF antenna. The at least one second RF antenna is spaced apart from the at least one first RF antenna for reduced interference from inter-antenna coupling. The communication subsystem is communicatively coupled to the at least one first RF antenna and the at least one second RF antenna. The communication subsystem includes at least one RF frontend to receive a first RF signal from the first and the second partial communication coverage. The at least one RF frontend demodulates the first RF signal to a first baseband signal. A communication cable extends from the support structure. The communication cable communicatively connects the communication subsystem to a second user device. A controller is communicatively coupled to the communication subsystem. The controller triggers the communication subsystem to transmit the first baseband signal through the communication cable with low data latency to the second user device. The communication device provides the second user device with increased communication spatial coverage and reduced interference from inter-antenna coupling than if the provided first and second RF antennas were constrained to a design form factor of the second user device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts a functional block diagram of an electronic device, specifically communication device 100, that is affixed, engaged, integrated, or attached to a support structure 101 configured to be worn on at least one part of body 102 (e.g., neck, shoulders, chest, abdomen, and/or waist) of person 103. Support structure 101 can include belt or strap fastening devices for donning and removing communication device 100 from body 102. Support structure 101 can include stretch materials to enable being worn on a chest. In one or more embodiments, support structure 101 includes a belt or strap that is similar or identical to an exercise fitness tracker configured to be worn on the chest. In one or more embodiments, communication device 100 includes components and functionality of an exercise fitness tracker.

Support structure 101 has first spatial portion 104a and second spatial portion 104b positionable on different parts of body 102. Person 103 also wears or carries second user device 105, which is presented as and interchangeably referred to as head worn device 105 located on head 106 of person 103. Examples of head worn devices (105) include smart glasses, head mounted displays (HMDs), or visors that present a virtual reality (VR), extended reality (XR), or augmented reality (AR) service. Head worn device 105 presents at least one of a visual and an audio output to person 103 wearing head worn device 105. Communication device 100 is communicatively coupled by communication cable 107 to head worn device 105 to support low data latency. In one or more embodiments, head worn device 105 has a design form factor that limits placement of RF antennas, and which can reduce communication performance because of interference between RF antennas that are in close proximity. Alternatively, or in addition, the limits on placement of RF antennas can limit the spatial communication coverage area of RF signals that may be received or be transmitted due to the communication obstruction created by head 106. The limitation in communication coverage is more pronounced in higher frequencies that are more line of sight, such as millimeter wave (mmWave) frequencies. According to different embodiments, communication device 100 may augment RF antenna communication coverage or may be the only provider of RF antenna communication coverage available to head worn device 105. In particular, spaced integration of RF antennas 108 in first spatial portion 104a and second spatial portion 104b of support structure 101 facilitates increased communication spatial coverage and reduced interference from inter-antenna coupling than if the antennas were constrained to a design form factor of second user device, such as a head worn device 105.

In one or more embodiments, communication device 100 provides communication coverage by communication subsystem 110 and does not include user interface functions. In one or more alternate embodiments, communication device 100 provides additional functionality of a user device, including, for example, user interface functions. Communication device 100 can be one of a host of different types of devices, including but not limited to, a mobile cellular phone, satellite phone, or smart-phone, a laptop, a net-book, an ultra-book, a networked smart watch, networked sports/exercise watch, an exercise fitness tracker, and/or a tablet computing device or similar device. Communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices. Most importantly, it is appreciated that the features described herein can be implemented with second user device 105 that utilizes communication services provided by communication device 100.

Referring now to the specific component makeup and the associated functionality of communication device 100. In one or more embodiments, in addition to communication subsystem 110, communication device 100 includes device memory 112, data storage subsystem 114, and input/output (I/O) subsystem (represented by device interface 116). Device interface 116 is communicatively connected to communication cable 107. Cable 107 includes communication conductor(s) or fiber(s) 118 that carry baseband signals between communication device 100 and second user device 105. In an example, communication cable 107 is a micro universal serial bus (USB) cable. In one or more embodiments, communication cable 107 includes conductors 120-121 to provide electrical power to second user device 105 or vice-versa. Communication device 100 includes battery 119 that provides electrical power for communication device 100.

Device memory 112, communication subsystem 110, data storage subsystem 114, and device interface 116 are communicatively connected by system interlink 122 and managed by controller 124. Device memory 112 includes program code for applications, such as communication application 126 and other application(s) 128. Device memory 112 further includes operating system (OS) 130, firmware interface 132, such as basic input/output system (BIOS) or Uniform Extensible Firmware Interface (UEFI), firmware 134, and data 136.

In one or more embodiments, controller 124 includes processor subsystem 138, which executes program code to provide operating functionality of communication device 100. The software and/or firmware modules have varying functionality when their corresponding program code is executed by processor subsystem 138 or secondary processing devices within communication device 100. Processor subsystem 138 of controller 124 can execute program code of communication application 126 and other application(s) 128 to configure communication device 100 to perform specific functions. Device memory 112 can include data 136 used by the applications. In one or more embodiments, controller 124 executes communication application 126 to transmit, with low data latency via cable 107, first baseband signal 185 to second user device 105 and to receive second baseband signal 186 from second user device 105.

In one or more embodiments, antenna elements of RF antennas 108 are operated as an array to achieve antenna steering in particular directions. Antenna steering enables selection of a particular antenna beam that provides the best communication quality. Mobility management dynamically switches to the best beam angle as the relative angle changes between the communication device and the base station. For example, fifth generation new radio (5G NR) mobility management is defined in the 3rd Generation Partnership Project (3GPP) standards Release 15-16, which includes procedures for mobility management. The communication device periodically performs transmit and receive beam sweeping to determine reference signal receive power measurements across up to 64 beams. For power and computational efficiency, communication device 100 selects an acquisition cone comprised of a subset of eight (8) beams of the 64 beams for mobility management. Certain power and computational efficiencies are realized by limiting the beams used during a subsequent communication session. The acquisition cone is sufficient to maintain mobility management with typical movements of communication device 100.

Referring now to the communication components and features of communication subsystem 110. Communication subsystem 110 of communication device 100 enables wireless communication with external communication system 140 and local communication system 142. Communication subsystem 110 includes radio frequency (RF) frontend 144 and communication module 146. RF frontend 144 includes transceiver(s) 148, which includes transmitter(s) 150 and receiver(s) 152. RF frontend 144 further includes modem(s) 154. Communication module 146 of communication subsystem 110 includes baseband processor 156 that communicates with processor subsystem 138 and RF frontend 144. In one or more embodiments, baseband processor 156 provides the functionality described herein of controller 124. Baseband processor 156 receives a control signal from a data processor of second user device 105 indicating a communication mode of communication subsystem 110. The communication mode can indicate communication frequencies, communication protocols and radio access technology (RAT), transmission and reception schedules, etc. Baseband processor 156 configures communication subsystem 110 to receive RF signals and to transmit RF signals in the communication mode. In one or more embodiments, baseband processor 156 is provided within controller 124. In one or more embodiments, controller 124 includes both processor subsystem 138 and baseband processor 156. In an example, processor subsystem 138 manages additional functionality, such supervising exercise fitness tracker module 157. In an example, exercise fitness tracker module 157 includes sensors that detect one or more of breaths, heart-rate, pulse, skin temperature, and steps. Baseband processor 156 operates in a baseband frequency range to encode data for transmission and to decode received data, according to a communication protocol. Modem(s) 154 modulate baseband encoded data from communication module 146 onto a carrier signal to provide a transmit signal that is amplified by transmitter(s) 150. Modem(s) 154 demodulates each signal received via RF antenna 108 from external communication system 140 or local communication system 142. The received signal is amplified and filtered by receiver(s) 152, which demodulate received encoded data from a received carrier signal.

In an example, external communication system 140 includes base nodes 158 and access nodes 160. In one or more embodiments, controller 124, via communication subsystem 110, performs multiple types of over-the-air (OTA) communication with base nodes 158 of external communication system 140. Base nodes 158 can be part of communication network infrastructure of public land mobile networks (PLMNs) that provide connections to plain old telephone systems (POTS) for voice calls and wide area networks (WANs) for data sessions. WANs can include Internet and other data networks. Base nodes 158 can be cellular "cells" or base stations that support cellular OTA communication using a radio access technology (RAT) as part of a radio access network (RAN). Unlike earlier generations of cellular services, where voice and data were handled using different RATs, both are now integrated, with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), has been deployed to at least augment capabilities of 4G LTE with a yet higher capability of data transfer. Development continues for what will be sixth generation (6G) RATs and more advanced RATs. With wireless frequency spectrum seemingly ever expanding, additional RF antennas 108 are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, access nodes 160 support wireless OTA communication. In one or more particular embodiments, access nodes 160 supports communication using one or more IEEE 802.11 wireless local area network (WLAN) protocols. Wi-Fi™ is a family of wireless network protocols, based on the IEEE 802.11 family of standards, which are commonly used between user devices and network devices that provide Internet access. In one or more embodiments, controller 124, via communication subsystem 110, performs multiple types of OTA communication with local communication system 142. Communication subsystem 110 can receive OTA communication from location services such as provided by global positioning system (GPS) satellites 162. In one or more embodiments, local communication system 142 includes local wireless device(s) 164, such as a smart watch that are coupled to communication device 100 to form a personal access network (PAN).

Data storage subsystem 114 of communication device 100 stores applications, program code, and stored data on non-volatile storage that is accessible by controller 124. For example, data storage subsystem 114 can provide a selection of applications and computer data such as communication application 126 and other application(s) 128. These applications can be loaded into device memory 112 for execution by controller 124. In one or more embodiments, data storage subsystem 114 includes one or more non-transitory computer program products or computer readable storage devices. In one or more embodiments, data storage subsystem 114 includes replaceable memory devices. Controller 124 can access data storage subsystem 114 to provision communication device 100 with new program code, such as code for communication application 126 and other application(s) 128.

Controller 124 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 124 includes processor subsystem 138, which includes one or more central processing units (CPUs), such as a data processor. Processor subsystem 138 can include one or more digital signal processors that are integrated with a data processor. Processor subsystem 138 can include other processors that are communicatively coupled to a data processor, such as baseband processor 156 of communication module 146. In one or embodiments that are not depicted, controller 124 may be implemented at least in part with distributed processing and control components that are external to support structure 101.

System interlink 122 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 122) are illustrated in FIG. 1, it is to be understood that more, fewer, or different interconnections may be present in other embodiments.

According to aspects of the present disclosure, communication device 100 includes support structure 101 that is configured to be worn on body 102 of person 103. Support structure 101 has first spatial portion 104a and second spatial portion 104b positionable on different parts of body 102. At least one first RF antenna 108a is attached to first spatial portion 104a of support structure 101 to provide first partial communication coverage in azimuth. At least one second RF antenna 108b is attached to second spatial portion 104b of support structure 101 to provide second partial communication coverage in azimuth that complements the first partial communication coverage of at least one first RF antenna 108a. At least one first RF antenna 108a is spaced apart from at least one second RF antenna 108b for reduced interference from inter-antenna coupling. In an example, first mmWave antenna array or module 168a is integrated in first spatial portion 104a and second mmWave antenna array or module 168b is integrated in second spatial portion 104b. Alternatively, or in addition, first Wi-Fi antenna 170a is integrated in first spatial portion 104a and second Wi-Fi antenna 170b is integrated in second spatial portion 104b. Communication subsystem 110 can operate first and second Wi-Fi antennas 170a-170b as two-by-two (2×2) Wi-Fi MIMO antenna array 172. Alternatively, or in addition, first low band (LB) antenna 174a is integrated in first spatial portion 104a and second LB antenna 174b is integrated in second spatial portion 104b. Communication subsystem 110 can operate first and second LB antennas 174a-174b as 2×2 LB MIMO antenna array 176. Alternatively, or in addition, first medium band/high band/ultra-high band (MB/HB/UHB) antenna 178a and second MB/HB/UHB antenna 178b are integrated in first spatial portion 104a. Third MB/HB/UHB antenna 178c and fourth MB/HB/UHB antenna 178d are integrated in second spatial portion 104b. Communication subsystem 110 can operate first, second, third, and fourth MB/HB/UHB antennas 174a-174d as four-by-four (4×4) MB/HB/UHB MIMO antenna array 180.

RF antennas 108 can also include other communication bands such GPS antenna 182 to receive GPS signals broadcast by GPS satellites 162 and include ultra-wide band module 188. RF antennas 108 can also include near field communication (NFC)/wireless charging module 189 to recharge battery 119. Communication subsystem 110 is communicatively coupled to at least one first RF antenna 108*a* and at least one second RF antenna 108*b*. Communication subsystem 110 includes at least one RF frontend 144 to receive first RF signal 184 from external communications system 140 that are within the first and the second partial communication coverage. At least one frontend 144 demodulates first RF signal 184 to first baseband signal 185. Communication cable 107 extends from support structure 101 and communicatively connects communication subsystem 110 to second user device 105. Controller 124 is communicatively coupled to communication subsystem 110. Controller 124 triggers communication subsystem 110 to transmit first baseband signal 185 through communication cable 107 to second user device 105 with low data latency. Communication device 100 receives second baseband signal 186 carried by communication cable 107 from second user device 105. Controller 124 directs communication subsystem 110 to modulate second baseband signal 186 to second RF signal 187 and to wirelessly transmit second RF signal 187 via at least one first RF antenna 108*a* and the at least one second RF antenna 108*b*.

Within the description of the remaining figures, references to similar components presented in a previous figure are provided the same reference numbers across the different figures. Where the named component is presented with different features or functionality, a different reference numeral or a subscripted reference numeral is provided (e.g., 100*a* in place of 100).

Figure 2:
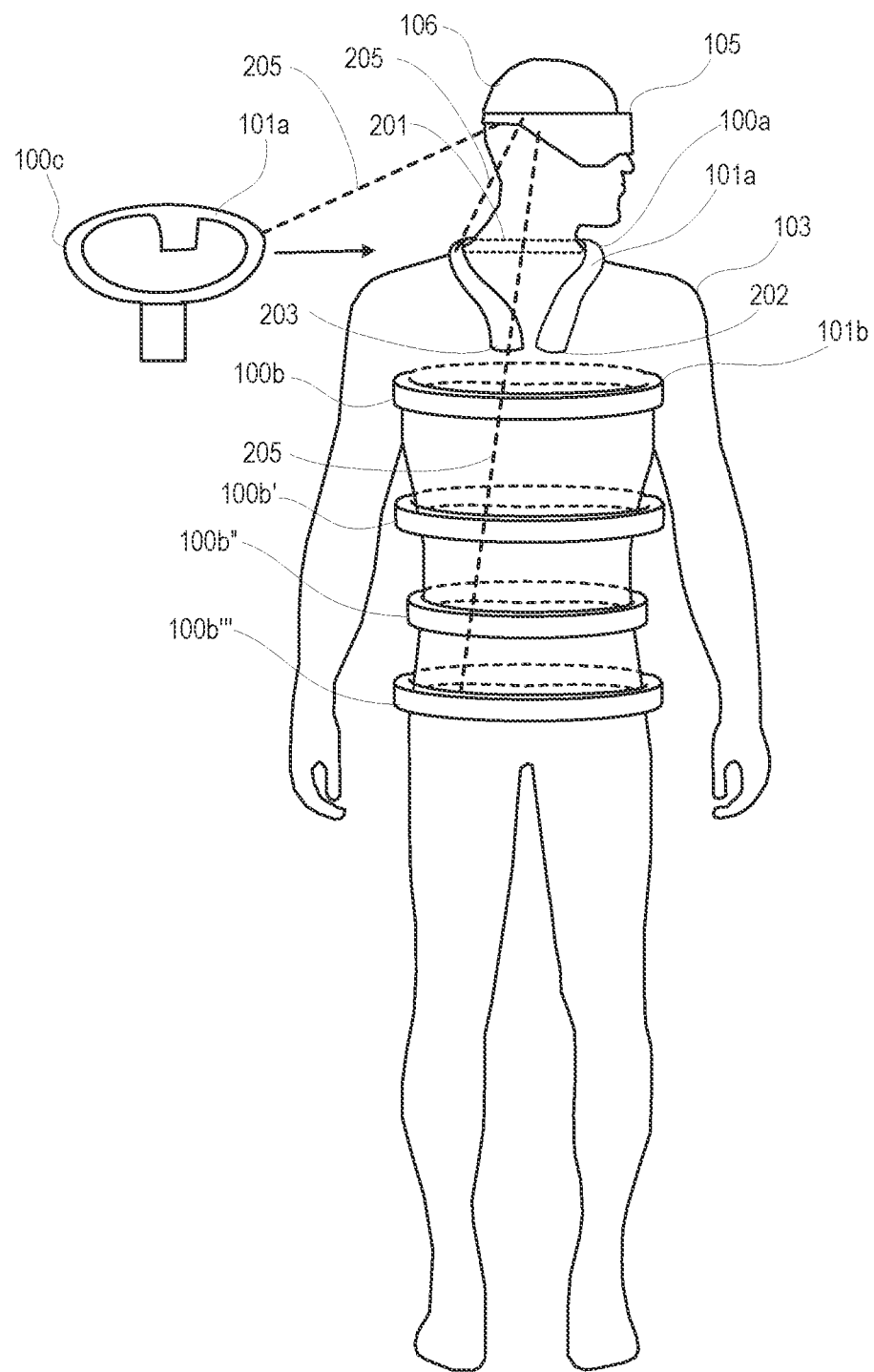
FIG. 2 depicts a front view of a person who is wearing the second user device that is communicatively coupled to one or more versions of the communication device of FIG. 1 to provide improved/expanded communication coverage, according to one or more embodiments.

FIG. 2 depicts a front view of person 103 wearing second user device 105 that is communicatively coupled to one or more communication devices 100*a*, 100*b*, and 100*c* to provide improved antenna communication coverage. In one embodiment, communication device 100*a* includes support structure 101*a* having a shape of a neck sash, stole or tippet with central portion 201 that wraps around a back side of the neck or upper shoulders of person 103 and that has left and right ends 202-203 presenting a pendant in front left and right front sides of body 102. Communication device 100*a* is described below with regard to FIGS. 3-4. In another embodiment, communication device 100*b* includes support structure 101*b* having a shape of a torso strap or belt. For example, communication device can be a strap worn around the chest in a manner similar to an exercise fitness tracker. In one or more embodiments, communication device 100*b* includes components and function to operate as an exercise fitness tracker. Communication device 100*b*' is being worn around the abdomen. Communication device 100*b*" is being worn around the waist. Communication device 100*b*''' is being worn around the hips. Communication device 100*b* is described below with regard to FIGS. 5-6. In an additional embodiment, communication device 100*c* includes support structure 101*c* having a shape of a neck yoke having central ring portion 209 that wraps around the neck of person 103 and that has front and back portions 211-212 that extend downwardly. Communication device 100*c* is described below with regard to FIGS. 7-10. In one or more embodiments, each of communication device 100*a*-100*c* can be communicatively coupled to second user device 105 by a wireless link 205. In one or more alternate embodiments, each of communication device 100*a*-100*c* can be communicatively coupled to second user device 105 by a physical communication link, such as communication cable 107 (FIG. 1). In one or more embodiments, one or more of communication device 100*a*-100*c* can support communication with second user device 105 using both wireless and/or wired link.

Figure 3:
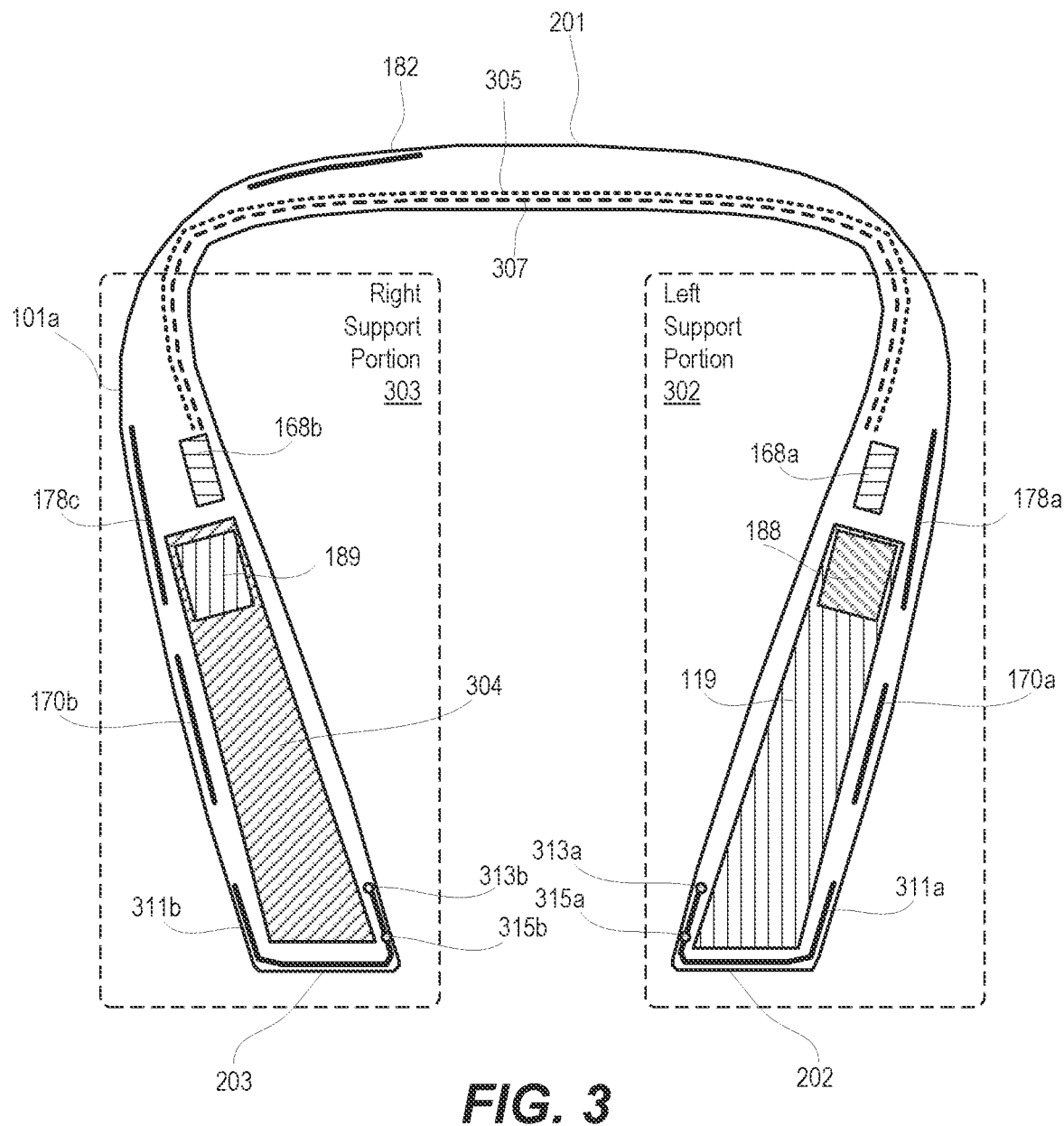
FIG. 3 is a front view of the first version of the communication device of FIG. 2 that has a shape of a neck sash, stole or tippet, according to one or more embodiments.
Figure 4:
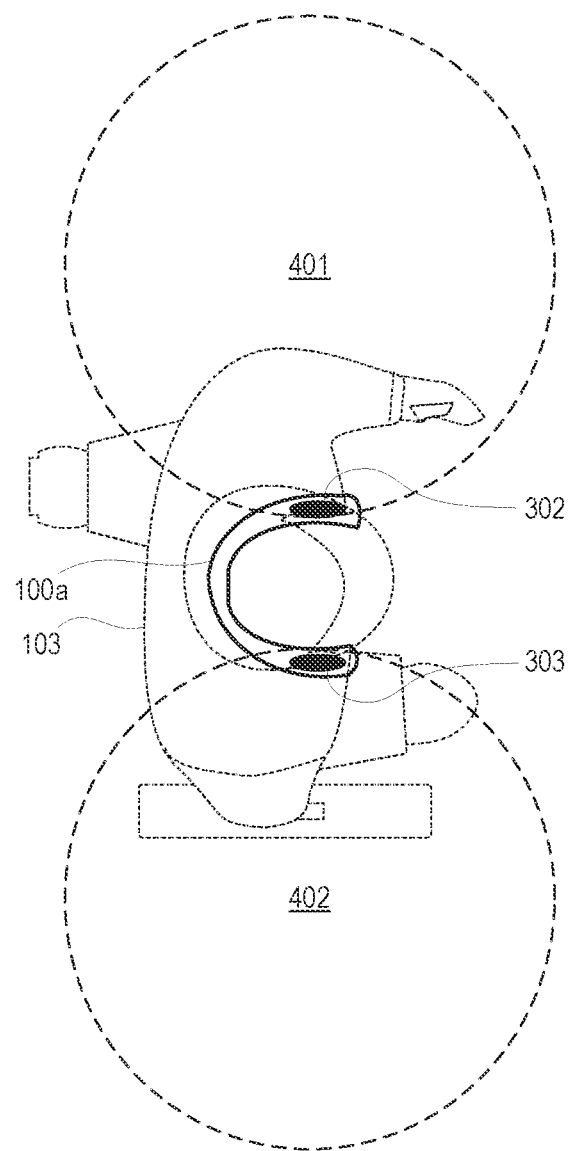
FIG. 4 is a top view of the communication device of FIG. 3 providing first and second spatial communication coverage areas respectively to a left and right of a person, according to one or more embodiments.

FIG. 3 is a front view of communication device 100*a* that includes support structure 101*a* having a shape of a neck sash, stole or tippet with central portion 201 between left and right ends 202-203. GPS antenna 182 is integrated into central portion 201. Support structure 101*a* includes left support portion 302 and right support portion 303. FIG. 4 is a top view of communication device 100*a* with left support portion 302 providing first spatial communication coverage area 401 and right support portion 303 providing second spatial communication coverage area 402 respectively to a left and right of person 103. With particular reference to FIG. 3, battery 119 is integrated into left end 202 of support structure 101*a*. Printed circuit board (PCB) assembly 304 that includes computing and storage components such as data memory 112 and processor subsystem 138 (FIG. 1) is incorporated into right end 203. Power and communication interconnections between left and right ends 202-203 are provided respectively through central portion 201 by power/ground wires 305 and RF coaxial cables 307.

First RF antennas 108*a* (FIG. 1) is embedded/located in left support portion 302 and include first mmWave module 168*a*. Second RF antennas 108*b* (FIG. 1) is embedded/located in right support portion 303 and include second mmWave module 168*b*. First RF antennas 108*a* (FIG. 1) in left support portion 302 includes first Wi-Fi antenna 170*a* of 2×2 Wi-Fi MIMO antenna array 172 (FIG. 1). Second RF antennas 108*b* (FIG. 1) in right support portion 303 includes second Wi-Fi antenna 170*b* of 2×2 Wi-Fi MIMO antenna array 172 (FIG. 1). First RF antennas 108*a* (FIG. 1) in left support portion 302 also includes first MB/HB/UHB antenna 178*a* of 4×4 MB/HB/UHB MIMO antenna array 180 (FIG. 1). U-shaped left antenna element 311*a* in left support portion 302 includes first excitation point 313*a* to operate as second MB/HB/UHB antenna 178*b* of 4×4 MB/HB/UHB MIMO antenna array 180 (FIG. 1) and second excitation point 315*a* to operate as first LB antenna 174*a* of 2×2 LB MIMO antenna array 176 (FIG. 1). Second RF antennas 108*b* (FIG. 1) in right support portion 303 also includes third MB/HB/UHB antenna 178*c* of 4×4 MB/HB/UHB MIMO antenna array 180 (FIG. 1). U-shaped right antenna element 311*b* in right support portion 303 includes first excitation point 313*b* to operate as fourth MB/HB/UHB antenna 178*d* of 4×4 MB/HB/UHB MIMO antenna array 180 (FIG. 1) and second excitation point 315*b* to operate as second LB antenna 174*b* of 2×2 LB MIMO antenna array 176 (FIG. 1). Communication device 100*a* includes UWB module 188 and NFC/wireless charging module 189.

Figure 5:
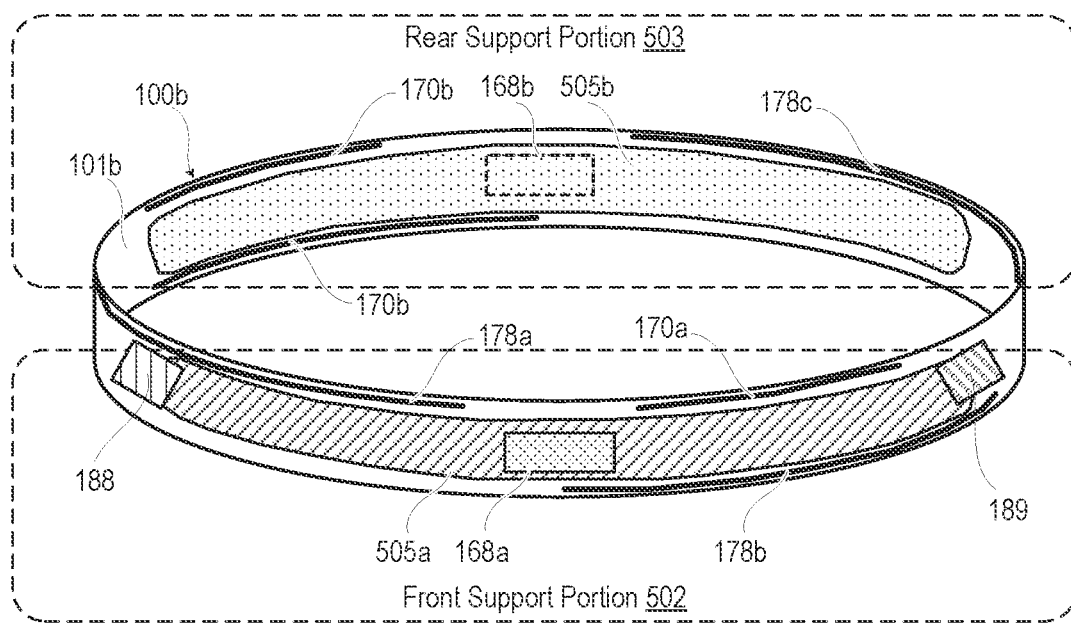
FIG. 5 is a three-dimensional view of the second version of the communication device of FIG. 2 that has a shape of a torso belt, according to one or more embodiments.
Figure 6:
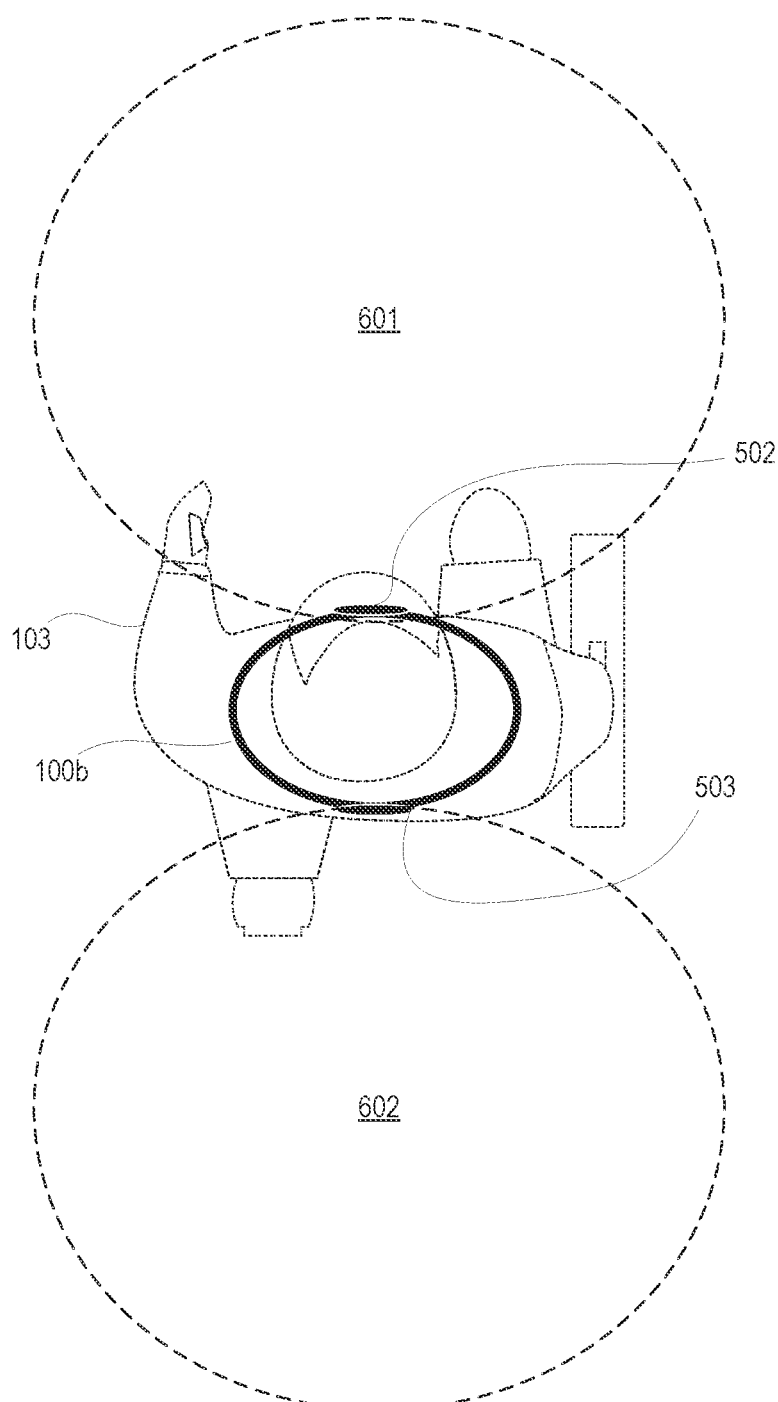
FIG. 6 is a top view of the communication device of FIG. 5 providing first and second spatial communication coverage areas respectively to a front and rear of a person, according to one or more embodiments.

FIG. 5 is a three-dimensional view of communication device 100*b* that includes support structure 101*b* having a shape of a torso belt worn at the hips, waist, or chest. Support structure 101*b* includes left support portion 502 and right support portion 503. FIG. 6 is a top view of communication device 100*b* including support structure 101*b*. Front support portion 502 provides first spatial communication coverage area 601 to a front side of person 103. Rear support portion 503 provides second spatial communication coverage area 602 to a rear side of person 103. With particular reference to FIG. 5, first battery/PCB assembly 505*a* is integrated into front support portion 502 and second battery/PCB assembly 505*b* is integrated into rear support portion 503. First mmWave module 168*a* is integrated into front support portion 502 and second mmWave module 168*b* is integrated into rear support portion 503. First RF antennas 108*a* (FIG. 1) in front support portion 502 on a top left edge includes first Wi-Fi antenna 170a of 2×2 Wi-Fi MIMO antenna array 172 (FIG. 1). Second RF antennas 108b (FIG. 1) on a top right edge in rear support portion 503 includes second Wi-Fi antenna 170b of 2×2 Wi-Fi MIMO antenna array 172 (FIG. 1). Front support portion 502 on a top right edge includes first MB/HB/UHB antenna 178a of 4×4 MB/HB/UHB MIMO antenna array 180 (FIG. 1). Front support portion 502 on a bottom left edge includes second MB/HB/UHB antenna 178b of 4×4 MB/HB/UHB MIMO antenna array 180 (FIG. 1). Rear support portion 503 on a top left edge includes third MB/HB/UHB antenna 178c of 4×4 MB/HB/UHB MIMO antenna array 180 (FIG. 1). Rear support portion 503 on a bottom right edge includes fourth MB/HB/UHB antenna 178d of 4×4 MB/HB/UHB MIMO antenna array 180 (FIG. 1). Communication device 100b includes UWB module 188 and NFC/wireless charging module 189.

Figure 7:
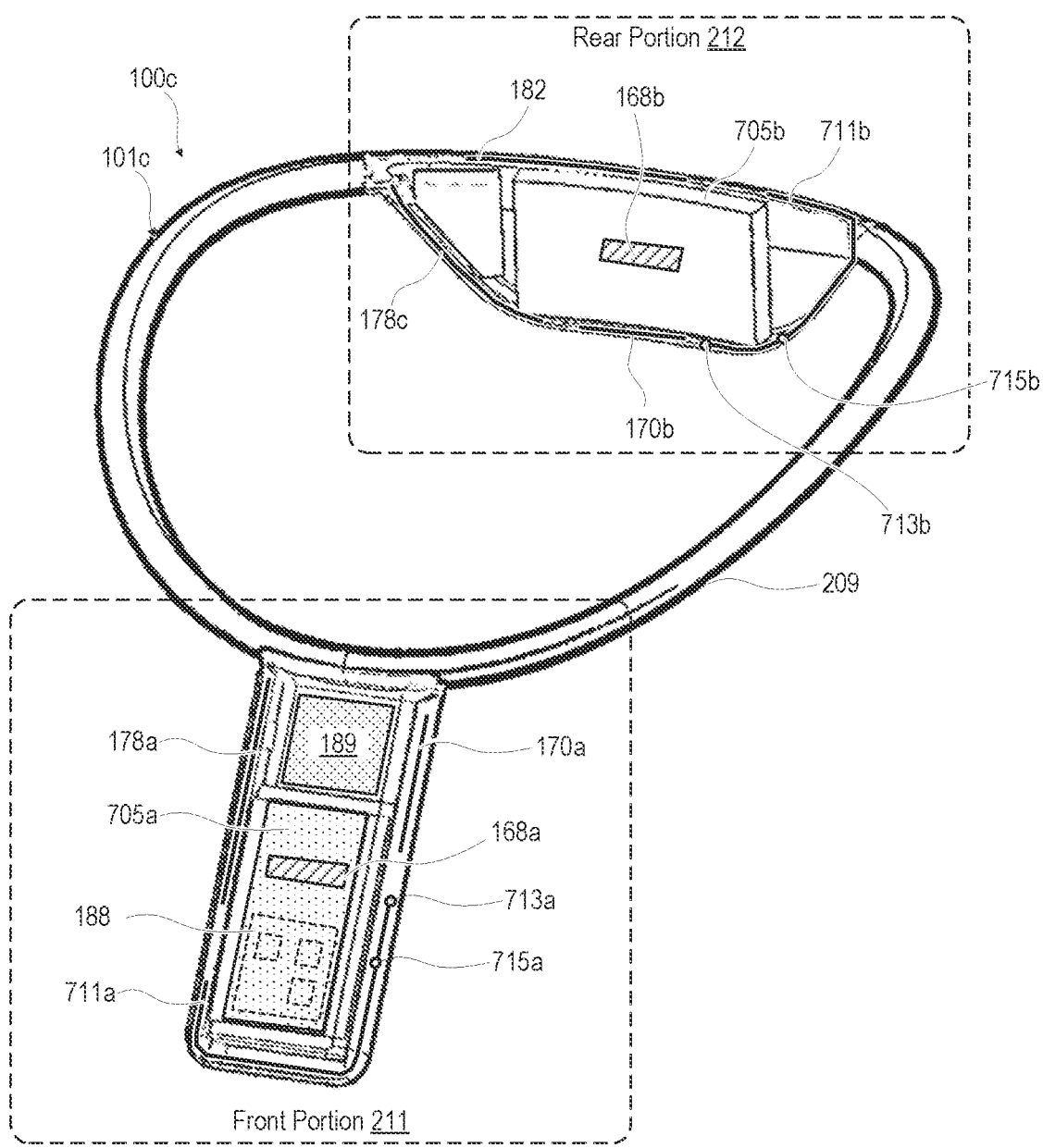
FIG. 7 is a three-dimensional view of the third version of the communication device of FIG. 2 that has a shape of a neck yoke, according to one or more embodiments.
Figure 8:
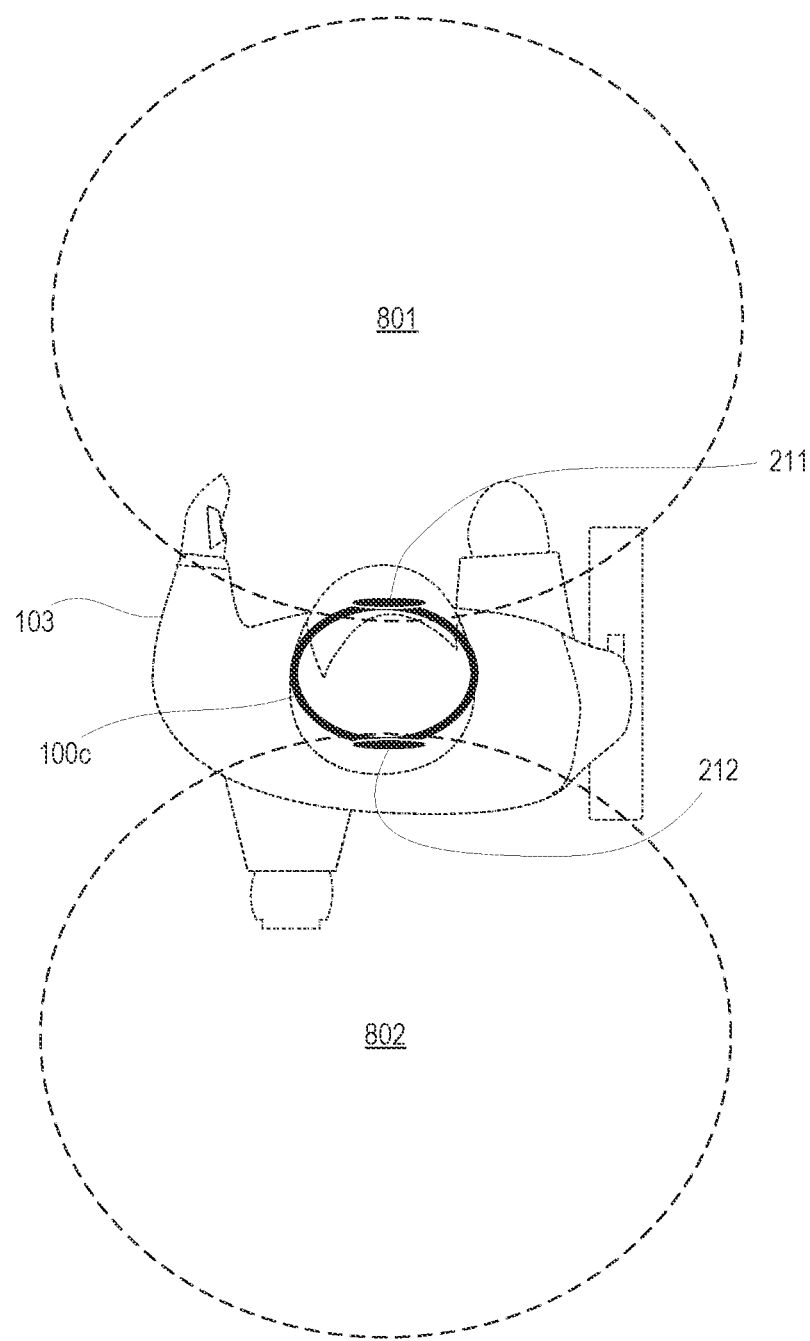
FIG. 8 is a cross section view of a front portion of the communication device of FIG. 7, according to one or more embodiments.

FIG. 7 is three-dimensional view of third version communication device 100c that includes support structure 101c having a shape of a neck yoke with central ring portion 209 that positions front and back portions 211-212 to extend downwardly on opposite sides. FIG. 8 is a top view of communication device 100c of FIG. 7 including support structure 101c. Front portion 211 provides first spatial communication coverage area 801 to a front side of person 103. Rear portion 212 provides second spatial communication coverage area 802 to a rear side of person 103. With particular reference to FIG. 7, first battery/PCB assembly 705a is integrated into front portion 211 ("frontpod") and second battery/PCB assembly 705b is integrated into rear portion 212 ("rearpod"). First mmWave module 168a is integrated into front portion 211 and second mmWave module 168b is integrated into rear portion 212. Front portion 211 includes ultra-wide band module 188 and NFC/wireless charging module 189. First RF antennas 108a (FIG. 1) in front portion 211 on upper right edge includes first Wi-Fi antenna 170a of 2×2 Wi-Fi MIMO antenna array 172 (FIG. 1). Second RF antennas 108b (FIG. 1) centered on bottom edge in rear portion 212 includes second Wi-Fi antenna 170b of 2×2 Wi-Fi MIMO antenna array 172 (FIG. 1). Front portion 211 on an upper left edge includes first MB/HB/UHB antenna 178a of 4×4 MB/HB/UHB MIMO antenna array 180 (FIG. 1). U-shaped front antenna element 711a on a bottom edge of front portion 211 includes first excitation point 713a to operate as second MB/HB/UHB antenna 178b of 4×4 MB/HB/UHB MIMO antenna array 180 (FIG. 1) and second excitation point 715a to operate as first LB antenna 174a of 2×2 LB MIMO antenna array 176 (FIG. 1). Second RF antennas 108b (FIG. 1) along a lower right edge of rear portion 212 also includes third MB/HB/UHB antenna 178c of 4×4 MB/HB/UHB MIMO antenna array 180 (FIG. 1). U-shaped rear antenna element 711b on a left edge of rear portion 212 includes first excitation point 713b to operate as fourth MB/HB/UHB antenna 178d of 4×4 MB/HB/UHB MIMO antenna array 180 (FIG. 1) and second excitation point 715b to operate as second LB antenna 174b of 2×2 LB MIMO antenna array 176 (FIG. 1). GPS antenna 182 is integrated along a top edge of rear portion 212.

FIG. 9 is a cross section view of front portion 211 of communication device 100c of FIG. 7 that has EM shield 901a along medial side 903a that is adjacent to front battery 905 and PCB assembly 907 of first battery/PCB assembly 705a. First RF antenna 108a is integrated on lateral side 909a away from person 103. EM shield 901a blocks RF and EM emissions from penetrating person 103.

FIG. 10 is a cross section view of rear portion 212 of communication device 100c of FIG. 7 that has EM shield 901b along medial side 903b that is adjacent to front battery 1015 and PCB assembly 1017 of second battery/PCB assembly 705b. Second RF antenna 108b is integrated on lateral side 909b away from person 103. EM shield 901b blocks RF and EM emissions from penetrating person 103. For low frequency band below 1 GHz, 2×2 LB MIMO antenna array 176 (FIG. 1) may be an implementation of a loop antenna for better antenna gain as compared to monopole type antenna solution. For medium/high frequency bands of 2×2 LB MIMO antenna array 176 (FIG. 1), specific absorption rate (SAR) is going to be relatively less in loop antenna design.

Figure 11:
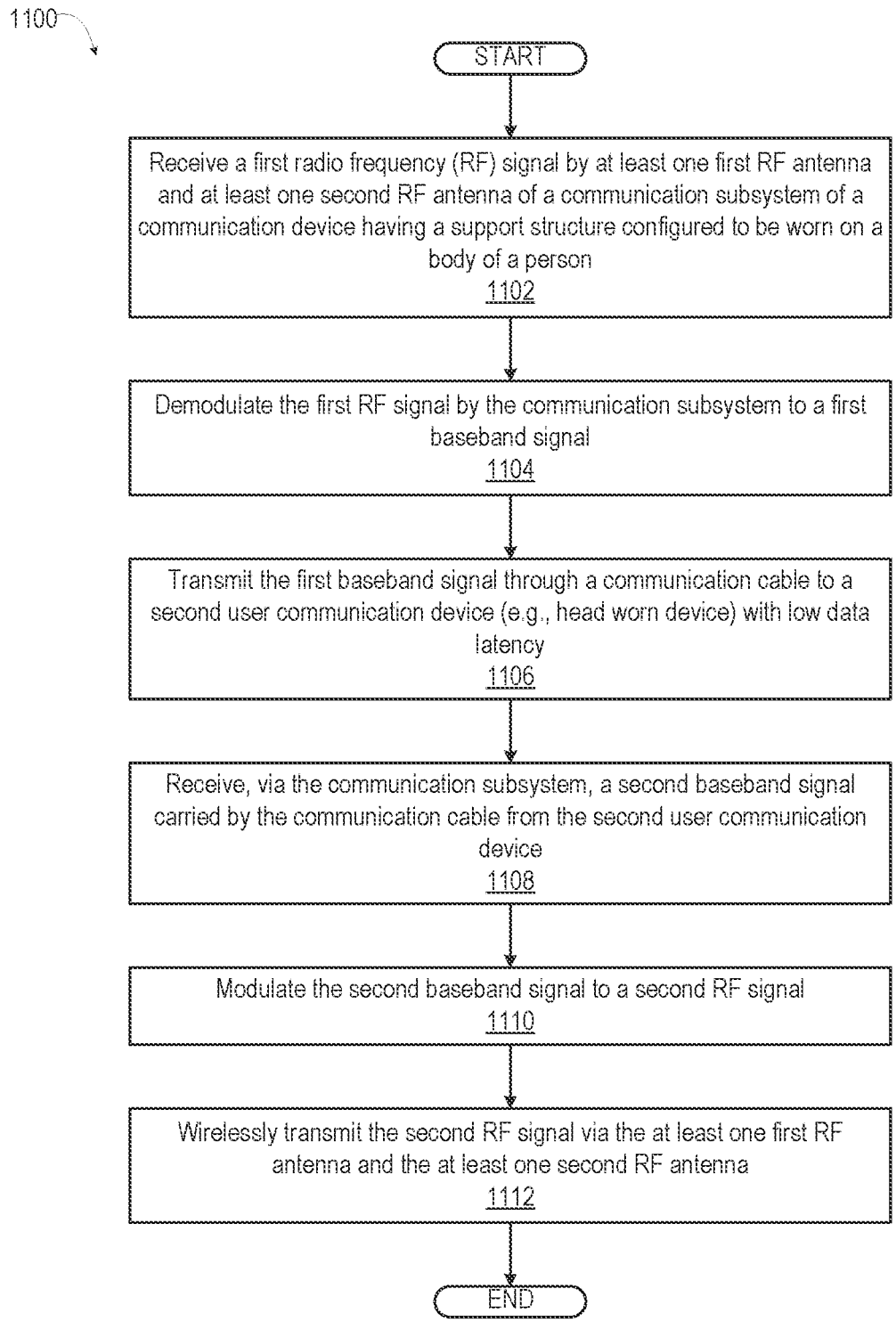
FIG. 11 depicts a flow diagram of a method performed by a communication device for increased communication spatial coverage and reduced interference from inter-antenna coupling, according to one or more embodiments.

FIG. 11 presents a flow diagram of method 1100 performed by the communication device that receives and transmits RF signals with increased communication spatial coverage and reduced interference from inter-antenna coupling. The descriptions of method 1100 is provided with general reference to the specific components illustrated within the preceding FIGS. 1-10, and specific components referenced in method 1100 may be identical or similar to components of the same name used in describing preceding FIGS. 1-10. In one or more embodiments, controller 124 configures communication device 100 to provide functionality of method 1100.

With reference to FIG. 11, method 1100 includes receiving a first radio frequency (RF) signal by at least one first RF antenna and at least one second RF antenna of a communication subsystem of a communication device having a support structure configured to be worn on a body of a person (block 1102). The support structure has a first spatial portion including the at least one first RF antenna positionable on a first side of the body to provide first partial communication coverage in azimuth. The support structure has a second spatial portion including the at least one second RF antenna positionable on a second side of the body that is different from the first side to provide second partial communication coverage in azimuth. In one or more embodiments, the first side is opposed to the second side. The second partial communication coverage complements the first partial communication coverage of the at least one first RF antenna. The at least one first RF antenna and the at least one second RF antenna are spaced apart for reduced interference from inter-antenna coupling. Method 1100 includes demodulating the first RF signal by the communication subsystem to a first baseband signal (block 1104). Method 1100 includes transmitting the first baseband signal through a communication cable with low data latency to a second user device (e.g., a head worn device) (block 1106). Method 1100 includes receiving, by the communication subsystem, a second baseband signal carried by the communication cable from the second user communication device (block 1108). Method 1100 includes modulating the second baseband signal to a second RF signal (block 1110). Method 1100 includes wirelessly transmitting the second RF signal via the at least one first RF antenna and the at least one second RF antenna (block 1112). Then method 1100 ends.

In one or more embodiments, the controller that performs method 1100 is a baseband processor of the communication subsystem. Method 1100 further includes receiving a control signal from a data processor of the second user device indicating a communication mode of the communication subsystem. The communication mode can indicate communication frequencies, communication protocols and radio access technology (RAT), transmission and reception schedules, etc. Method 1100 includes configuring the communication subsystem to receive the first RF signal and to transmit the second RF signal in the communication mode.

In one or more embodiments, the at least one first RF antenna includes a first mmWave antenna array and the at least one second RF antenna includes a second mmWave antenna array, and method 1100 includes receiving a first millimeter wave (mmWave) signal as the first RF signal.

In one or more embodiments, the at least one first RF antenna includes at least one MB/HB/UHB antenna and the at least one second RF antenna includes at least one second MB/HB/UHB antenna, and method 1100 includes receiving a medium band/high band/ultra-high band (MB/HB/UHB) signal as the first RF signal. In one or more particular embodiments, the at least one first MB/HB/UHB antenna includes a left first MB/HB/UHB antenna and a right first MB/HB/UHB antenna that is laterally spaced from the left first MB/HB/UHB antenna. The second MB/HB/UHB antenna includes a left second MB/HB/UHB antenna and a right second MB/HB/UHB antenna that is laterally spaced from the left second MB/HB/UHB antenna. With these embodiments, method 1100 further includes operating the left first, the left second, the right first, and the right second MB/HB/UHB antennas as a 4 by 4 multiple input multiple output (MIMO) antenna array by the communication subsystem.

In one or more embodiments, the at least one first RF antenna includes at least one first low band (LB) antenna. The at least one second RF antenna includes at least one second LB antenna. Method 1100 includes operating the first and the second LB antenna as a 2 by 2 multiple input multiple output (MIMO) antenna array by the communication subsystem.

In one or more embodiments, the at least one first RF antenna and the at least one second RF antenna are positioned by the support structure that has a shape of one of: (i) a neck yoke having at least one of a front portion extending downward and a rear portion extending downward; (ii) a torso belt worn at the hips, waist, or chest; and (iii) a neck band configured to wrap around a back portion of a neck with left and right ends configured to extend downwardly on left and right front sides of the torso. Method 1100 includes communicatively coupling the communication subsystem to the second user device via the communication cable.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
   a support structure configured to be worn on a body of a person, the support structure having a first spatial portion and a second spatial portion positionable on different parts of the body;
   at least one first radio frequency (RF) antenna attached to the first spatial portion of the support structure to provide first partial communication coverage in azimuth, the at least one first RF antenna comprising (i) at least one first low band (LB) antenna and (ii) at least one first medium band/high band/ultra-high band (MB/HB/UHB) antenna;
   at least one second RF antenna attached to the second spatial portion of the support structure to provide second partial communication coverage in azimuth that complements the first partial communication coverage of the at least one first RF antenna and spaced apart from the at least one RF antenna for reduced interference from inter-antenna coupling, the at least one second RF antenna comprising (i) at least one second LB antenna and (ii) at least one second MB/HB/UHB antenna;
   a communication subsystem communicatively coupled to the at least one first RF antenna and the at least one second RF antenna and comprising at least one RF frontend to receive a first RF signal from the first and the second partial communication coverage and to demodulate the first RF signal to a first baseband signal, and wherein the communication subsystem operates the first and the second LB antenna as a 2 by 2 LB multiple input multiple output (MIMO) antenna array for low frequency band below 1 GHZ;
a communication cable extending from the support structure, and which communicatively connects the communication subsystem to a second user device; and
a controller communicatively coupled to the communication subsystem, and which triggers the communication subsystem to transmit the first baseband signal through the communication cable to the second user device with low data latency, wherein the controller comprises a baseband processor, and which:
receives a control signal from a data processor of the second user device indicating a communication mode of the communication subsystem; and
configures the communication subsystem to receive the first RF signal and to transmit the second RF signal in the communication mode.

2. The communication device of claim 1, wherein:
the communication device receives a second baseband signal carried by the communication cable from the second user device; and
the controller directs the communication subsystem to modulate the second baseband signal to a second RF signal and to wirelessly transmit the second RF signal via the at least one first RF antenna and the at least one second RF antenna.

3. The communication device of claim 2, wherein:
the at least one first RF antenna comprises a first millimeter wave (mmWave) antenna array;
the at least one second RF antenna comprises a second mmWave antenna array;
the first RF signal comprises a first mmWave signal; and
the second RF signal comprises a second mmWave signal.

4. The communication device of claim 1, wherein:
the at least one first MB/HB/UHB antenna comprises a left first MB/HB/UHB antenna and a right first MB/HB/UHB antenna that is laterally spaced from the left first MB/HB/UHB antenna;
the second MB/HB/UHB antenna comprises a left second MB/HB/UHB antenna and a right second MB/HB/UHB antenna that is laterally spaced from the left second MB/HB/UHB antenna; and
the communication subsystem operates the left first, the left second, the right first, and the right second MB/HB/UHB antennas as a 4 by 4 multiple input multiple output (MIMO) antenna array.

5. The communication device of claim 1, wherein the support structure has a shape of one of: (i) a neck yoke having a front portion and a rear portion on a different side to the front portion; (ii) a torso belt; and (iii) a neck band configured to wrap around a back portion of a neck with left and right ends configured to extend downwardly on left and right front sides of the body.

6. The communication device of claim 1, wherein the first baseband signal comprises at least one of visual and audio output and transmitted to the second user device comprising a head worn device configured to present the at least one of visual output and audio output to the person wearing the head worn device.

7. The communication device of claim 1, wherein the support structure is configured when worn on the body of the person to position the at least one first RF antenna and the at least one second RF antenna respectively on opposite sides of the body.

8. The communication device of claim 1, further comprising
a first U-shaped left antenna element located within the first support portion and comprising a first excitation point to operate as a third MB/HB/UHB antenna of a 4×4 MB/HB/UHB MIMO antenna array and second excitation point to operate as the first LB antenna of a 2×2 LB MIMO antenna array.

9. The communication device of claim 1, further comprising a second U-shaped right antenna element located within the second support portion comprising a third excitation point to operate as a fourth MB/HB/UHB antenna of the 4×4 MB/HB/UHB MIMO antenna array and a fourth excitation point to operate as the second LB antenna of the 2×2 LB MIMO antenna array.

10. A method comprising:
receiving a first radio frequency (RF) signal by at least one first RF antenna and at least one second RF antenna of a communication subsystem of a communication device having a support structure configured to be worn on a body of a person, the support structure having a first spatial portion including the at least one first RF antenna that is positionable on a first side of the body to provide first partial communication coverage in azimuth and a second spatial portion including the at least one second RF antenna that is positionable on a second side of the body that is different from the first side to provide second partial communication coverage in azimuth that complements the first partial communication coverage of the at least one first RF antenna, the at least one first RF antenna and the at least one second RF antenna spaced apart for reduced interference from inter-antenna coupling, wherein: the at least one first RF antenna comprises (i) at least one first low band (LB) antenna, and (ii) at least one first medium band/high band/ultra-high band (MB/HB/UHB) antenna; and the at least one second RF antenna comprises (i) at least one second LB antenna, and (ii) at least one second MB/HB/UHB antenna;
operating the first and the second LB antenna as a 2 by 2 LB multiple input multiple output (MIMO) antenna array by the communication subsystem for low frequency band below 1 GHZ;
demodulating the first RF signal by the communication subsystem to a first baseband signal;
transmitting the first baseband signal through a communication cable to a second user device with low data latency;
receiving a control signal from the second user device indicating a communication mode of the communication subsystem; and
configuring the communication subsystem to receive the first RF signal and to transmit the second RF signal in the communication mode.

11. The method of claim 10, further comprising:
receiving, via the communication subsystem, a second baseband signal carried by the communication cable from the second user device;
modulating the second baseband signal to a second RF signal; and
wirelessly transmitting the second RF signal via the at least one first RF antenna and the at least one second RF antenna.

12. The method of claim 11, further comprising:
receiving the first RF signal comprising a first millimeter wave (mmWave) signal by the at least one first RF antenna comprising a first mmWave antenna array and the at least one second RF antenna comprising a second mmWave antenna array; and
transmitting the second RF signal comprising a second mmWave signal by the at least one first RF antenna comprising a first mmWave antenna array and the at least one second RF antenna comprising a second mmWave antenna array.

13. The method of claim 10, further comprising receiving the first RF signal comprising a medium band/high band/ultra-high band (MB/HB/UHB) signal by the at least one first MB/HB/UHB antenna and the at least one second MB/HB/UHB antenna.

14. The method of claim 13, wherein:
the at least one first MB/HB/UHB antenna comprises a left first MB/HB/UHB antenna and a right first MB/HB/UHB antenna that is laterally spaced from the left first MB/HB/UHB antenna;
the second MB/HB/UHB antenna comprises a left second MB/HB/UHB antenna and a right second MB/HB/UHB antenna that is laterally spaced from the left second MB/HB/UHB antenna; and
the method further comprises operating the left first, the left second, the right first, and the right second MB/HB/UHB antennas as a 4 by 4 multiple input multiple output (MIMO) antenna array by the communication subsystem.

15. The method of claim 10, further comprising receiving the first RF signal by the at least one first RF antenna and the at least one second RF antenna that are positioned by the support structure that has a shape of one of: (i) a neck yoke having at least one of a front portion extending downward and a rear portion extending downward; (ii) a torso belt; and (iii) a neck band configured to wrap around a back portion of a neck with left and right ends configured to extend downwardly on left and right front sides of the body.

16. The method of claim 10, further comprising transmitting the first baseband signal comprising at least one of visual and audio output to the second user device that comprises a head-worn device configured to present the at least one of visual output and audio output to the person wearing the head-worn device.

17. The method of claim 10, wherein the support structure is configured when worn on the body of the person to position the at least one first RF antenna and the at least one second RF antenna respectively on opposite sides of the body.

18. The method of claim 10, wherein the communication device further comprises a first U-shaped left antenna element located within the first support portion and comprising a first excitation point to operate as a third MB/HB/UHB antenna of a 4×4 MB/HB/UHB MIMO antenna array and second excitation point to operate as the first LB antenna of a 2×2 LB MIMO antenna array.

19. The method of claim 10, wherein the communication device further comprises a second U-shaped right antenna element located within the second support portion comprising a third excitation point to operate as a fourth MB/HB/UHB antenna of the 4×4 MB/HB/UHB MIMO antenna array and a fourth excitation point to operate as the second LB antenna of the 2×2 LB MIMO antenna array.

* * * * *